US006682043B1

(12) United States Patent
Hsieh

(10) Patent No.: US 6,682,043 B1
(45) Date of Patent: Jan. 27, 2004

(54) SHOCK-ABSORBING DEVICE FOR A MICROPHONE STAND

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 10/351,344

(22) Filed: Jan. 27, 2003

(51) Int. Cl.[7] ......................... H04R 11/04; F16M 13/00

(52) U.S. Cl. ....................... 248/638; 248/618; 381/363; 381/368

(58) Field of Search ................................ 381/361, 363, 381/368; 248/603, 604, 610, 611, 612, 619, 620, 621, 622, 638

(56) References Cited

U.S. PATENT DOCUMENTS 1,915,466 A * 6/1933 Lilly ....................... 248/180.1
3,573,401 A * 4/1971 Lininger ..................... 381/363
3,592,422 A * 7/1971 Paine et al. ................. 248/589
4,718,624 A * 1/1988 Greulich ..................... 248/158
4,955,578 A * 9/1990 Fidi ........................... 248/559
5,529,277 A * 6/1996 Ostaszewski ............... 248/603
5,942,735 A * 8/1999 Liang ......................... 181/207
6,226,386 B1 * 5/2001 Akino ........................ 381/173
6,459,802 B1 * 10/2002 Young ........................ 381/368
6,590,989 B2 * 7/2003 Chen .......................... 381/363

FOREIGN PATENT DOCUMENTS

JP 2002135875 A * 5/2003

OTHER PUBLICATIONS

U.S. patent application No. US 2002/0154789, Published Oct. 24, 2002, Inventor: Rodgers, Classification: 381,363.*

* cited by examiner

*Primary Examiner*—Ramon O. Ramirez
*Assistant Examiner*—Jon Szumny
(74) *Attorney, Agent, or Firm*—Rosenberg, Klein & Lee

(57) ABSTRACT

A shock-absorbing device for a microphone stand has a chamber (10), a cover (12) mounted on the chamber (10) and a central rod (13) mounted inside the chamber (10). The chamber (10) has multiple hooks (101) formed on the wall of the chamber and multiple resilient rings (11) around the central rod (13) and hooks (101) to suspend the central rod (13) inside the chamber and provide an excellent shock absorbing capability to the microphone stand.

7 Claims, 5 Drawing Sheets

SHOCK-ABSORBING DEVICE FOR A MICROPHONE STAND

FIELD OF THE INVENTION

The present invention relates to a shock-absorbing device, and more particularly to a shock-absorbing device for a microphone stand to prevent noise generated by impacting the microphone stand from being picked up by a microphone on t he stand.

DESCRIPTION OF RELATED ART

Microphones are used most often with large crowds such as concerts or speeches and are usually mounted on a microphone stand so users do not have to hold the microphone.

With reference to FIG. 5, a conventional microphone stand (5) is comprised of a base (50), a telescoping rod (51) and a microphone bracket (52).

The base (50) is a round plate setting on a flat surface. The telescoping rod (51) has a top end (not numbered) and a bottom end (not numbered) and is composed of two tubes slidably telescopically combined with each other so that the telescoping rod (51) is adjustable in height. The bottom end of the telescoping rod (51) is mounted on the base (50). The bracket (52) is mounted on the top end of the telescoping rod (51) and is adapted to firmly hold a microphone (53).

When the microphone stand (5) is bumped, shock waves are produced in the microphone stand (5). The shock waves travel through t he telescoping rod (51) and the bracket (52) to the microphone (53). The microphone (53) picks up the shock, converts the shock to an electrical signal and transmits the electrical signal to amplifiers. The amplifiers output the converted shock to the microphone stand (5) as noise through speakers. The noise mixed with a speaker's voice or performers' music will bother an audience, and performers or speaker are forced respectively to stop their performance or speech if the noise is too loud.

The present invention has arisen to mitigate or obviate the disadvantages of the conventional microphone stand.

SUMMARY OF THE INVENTION

The main objective of the present invention is to provide a shock-absorbing device for a microphone stand, which prevents an impact of the microphone stand from being picked up by a microphone mounted on the microphone stand.

Further benefits and advantages of the present invention will become apparent after a careful reading of the detailed description with appropriate reference to the accompanying drawings.

DETAILED DESCRIPTION OF THE PREFERRED EMBODIMENT

Figure 1:
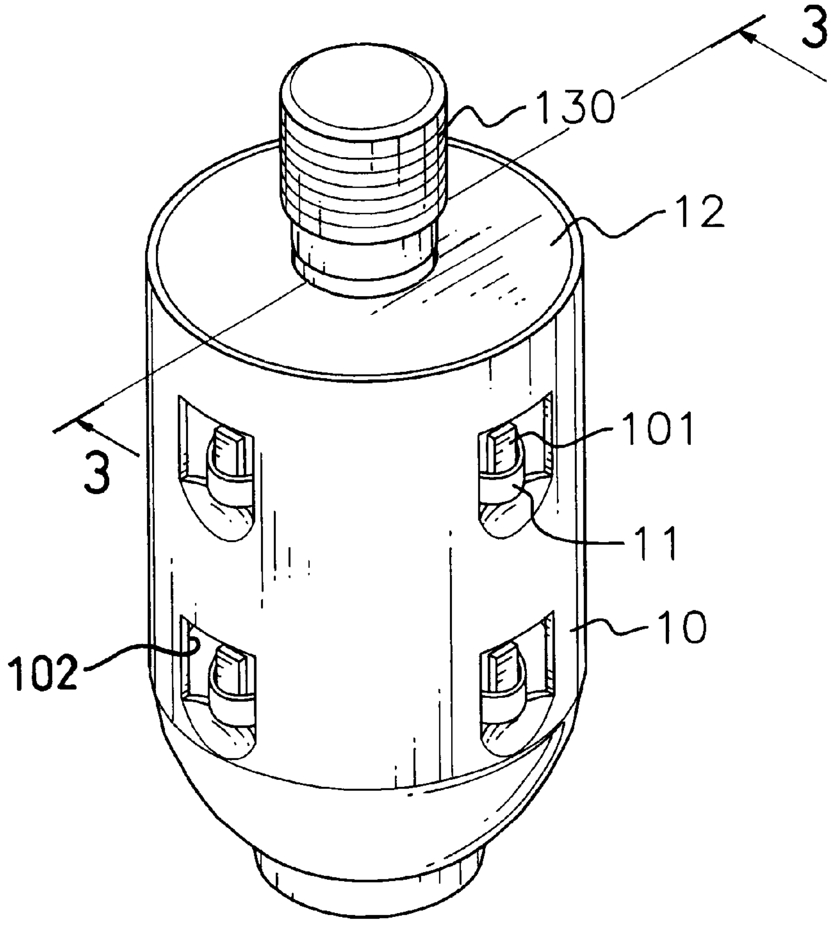
FIG. 1 is a perspective view of a shock-absorbing device for a microphone stand in accordance with the present invention.
Figure 2:
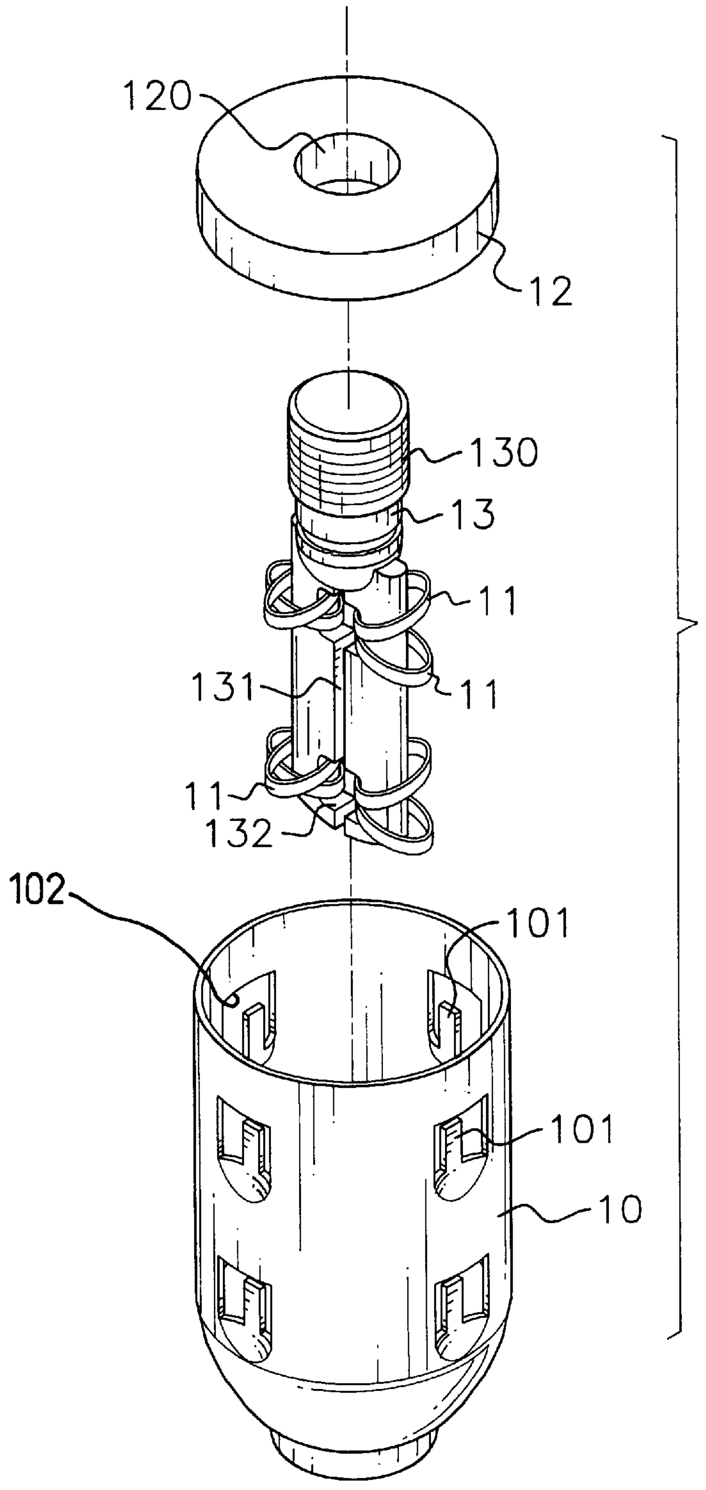
FIG. 2 is a n exploded perspective view of the shock-absorbing device in FIG. 1.
Figure 3:
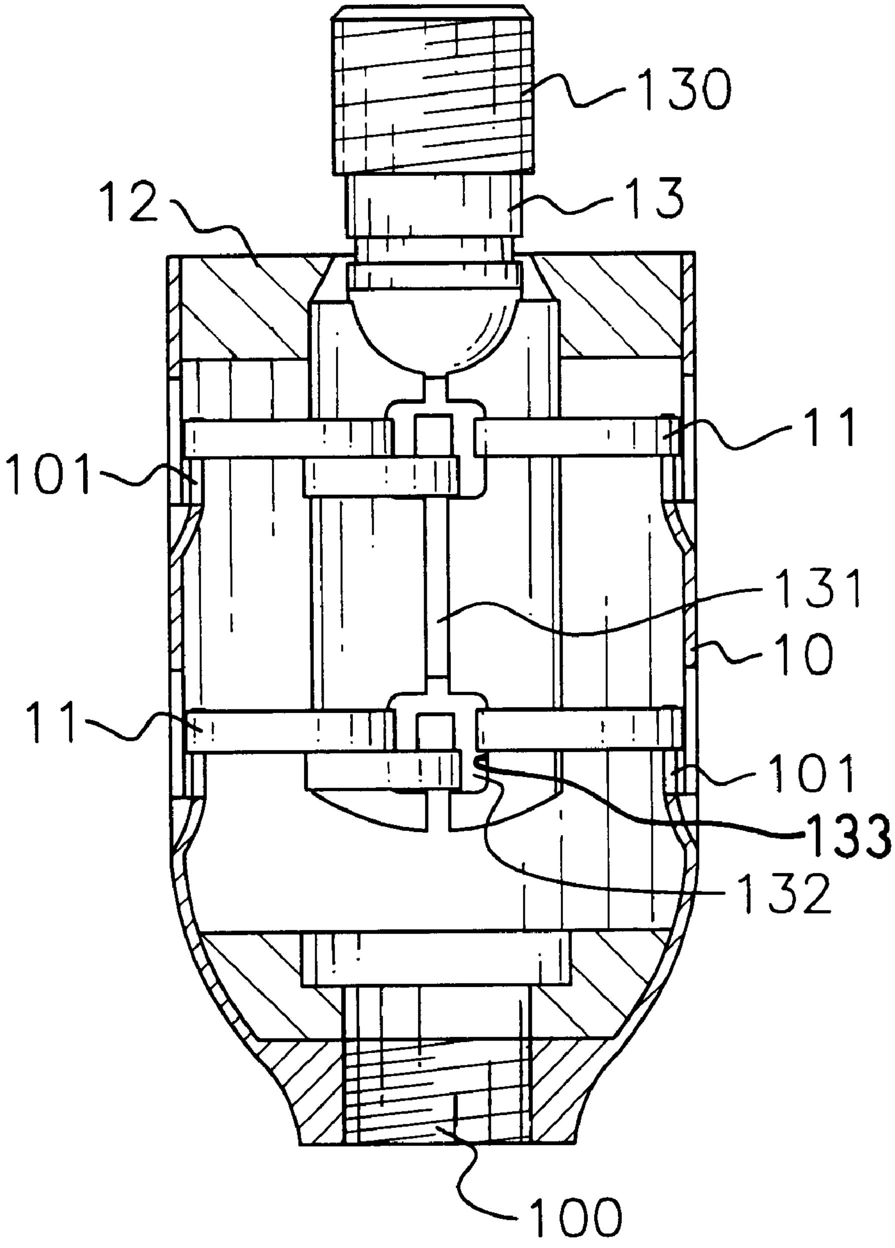
FIG. 3 is a cross-sectional side plan view of the shock-absorbing device along line 3—3 in FIG. 1.

With reference t o FIGS. 1, 2 and 3, a shock-absorbing device in accordance with the present invention is adapted to be mounted on a microphone stand and comprises of a chamber (10), a cover (12), and a central rod (13).

The chamber (10) is a tube-shaped base and has an upper opening (not numbered), a bottom (not numbered) and a cylindrical wall (not numbered) between the upper opening and the bottom. A threaded hole (100) is defined axially in the bottom, and multiple windows (102) are defined around the cylindrical wall. Each window (102) has an edge (not numbered) and a hook (101) protruding from the edge into the window (102).

The cover (12) is a round plug made of form plastic to provide a shock absorbing capability and cover the upper opening in the chamber (10). A central through hole (120) is defined in the cover (12) so the central rod (13) can extend through the central through hole (120) in the cover (12).

The central rod (13) is mounted inside the chamber (10) and has a first end and a forked end (132), wherein the first end is a threaded end (130). The first end penetrates the central through hole (120) and protrudes out of the chamber (10). The forked end (132) has a slit (131) longitudinally defined in the central rod (13) and at least one enlarged cutout (133) communicating with the slit (131) to provide more space in the forked end (132). Multiple resilient rings (11) are mounted in the enlarged cutouts (133) in the forked end (132) and loop around the hooks (101) respectively so that the central rod (13) is suspended inside the chamber (10).

Figure 4:
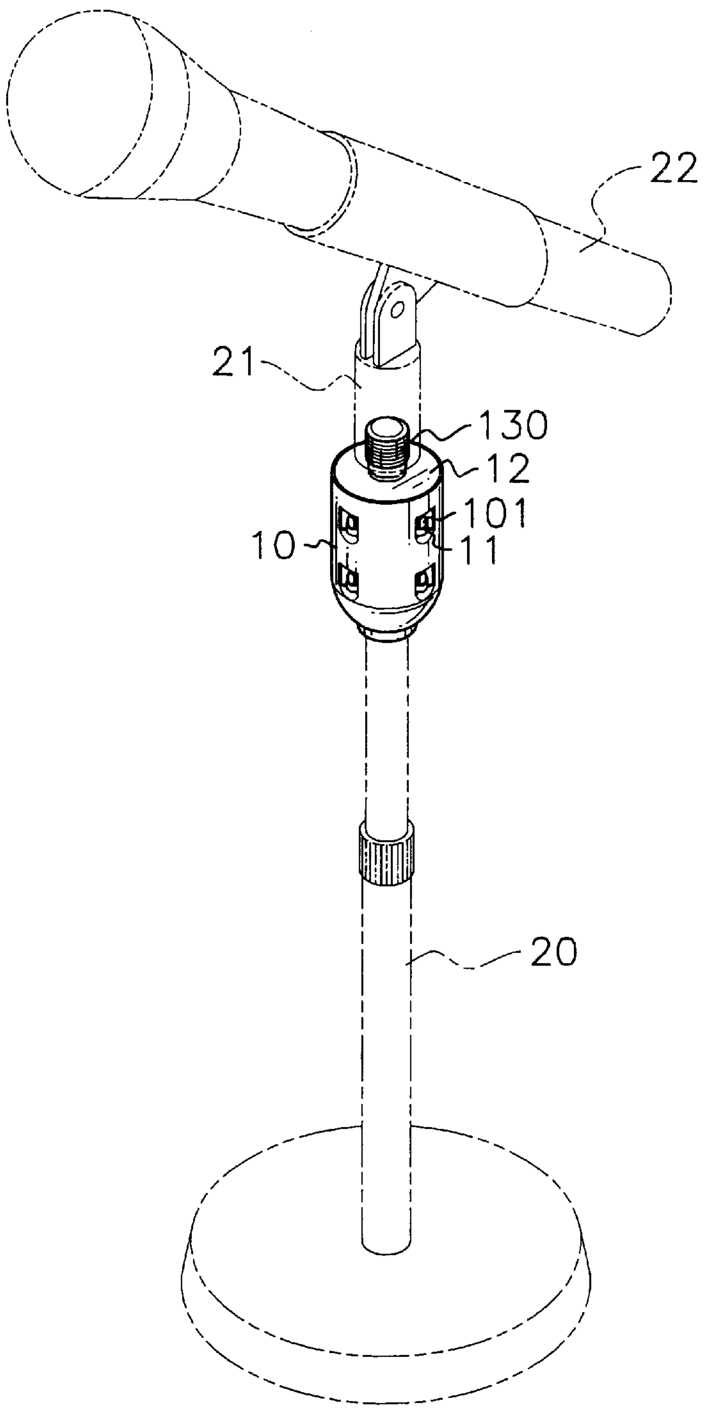
FIG. 4 is a perspective view of the shock-absorbing device in FIG. 1 mounted on a microphone stand.
Figure 5:
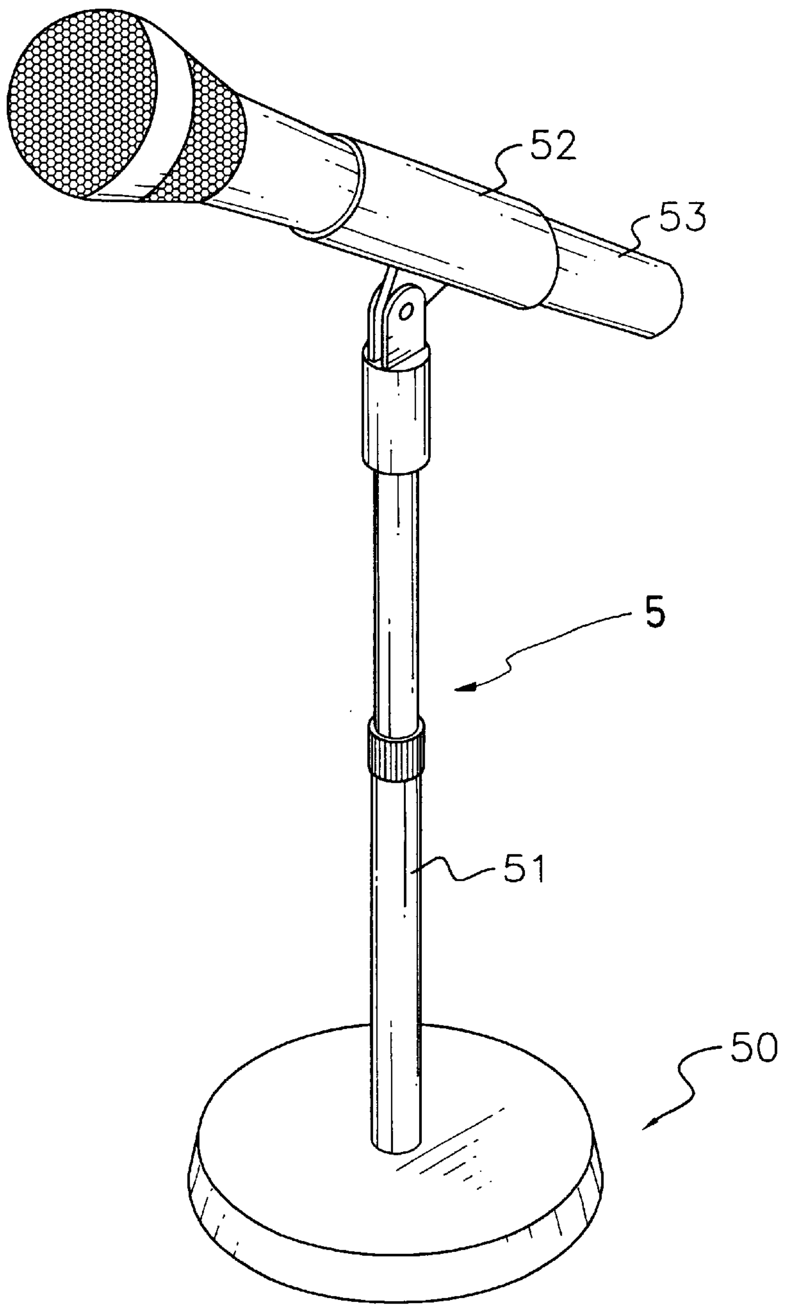
FIG.5 PRIOR ART
FIG. 5 is a perspective view of a conventional microphone stand with a microphone.

With reference further to FIG. 4, the microphone stand is composed of a telescoping rod (20) with an insert (not shown) and a microphone bracket (21) having a threaded socket (not numbered). The shock-absorbing device is mounted between the telescoping rod (20) and the microphone bracket (21) by screwing the threaded end (130) into the threaded socket in the microphone bracket (21) and screwing the telescoping rod (20) into the threaded hole (100) in the bottom of the shock-absorbing device. When the microphone stand is used, a microphone (22) is mounted in the microphone bracket (21). If the microphone stand is bumped, shock waves are absorbed by the multiple resilient rings (11) in the chamber (10). Therefore, the shock waves will not be transmitted to and picked up by the microphone (22) and converted to noise. Moreover, to prevent shock waves from being transmitted through a junction of the chamber (10) and the microphone bracket (21), the cover (12) made of resilient plastic (form plastic) also provides a shock-absorbing capability. Thereby, the shock waves will be eliminated at the shock-absorbing device keep shock and vibrations from being transmitted to the microphone (22).

Although the invention has been explained in relation to its preferred embodiment, it is to be understood that many other possible modifications and variations can be made without departing from the spirit and scope of the invention as hereinafter claimed.

What is claimed is:

1. A shock-absorbing device adapted to be mounted between a telescoping rod and a microphone bracket of a microphone stand, the shock-absorbing device comprising:

a chamber (10) adapted to be mounted on the telescoping rod and having an upper opening, a bottom and a wall between the upper opening and the bottom;

multiple windows (102) defined around the wall, wherein each window (102) has an edge and a hook (101) protruding from the edge into the window (102);

a central rod (13) mounted inside the chamber (10) and having a first end adapted to connect to the microphone bracket of the microphone stand and a forked end (132) having a slit (131) longitudinally defined in the central rod (13); and multiple resilient rings (11) mounted on the forked end (132) and each resilient ring (11) looping around one of the hooks (101) to make the central rod (13) suspended inside the chamber (10).

2. The shock-absorbing device as claimed in claim 1, wherein the shock-absorbing device further comprises:

a cover (12) made of resilient material covering the opening in the chamber (10) to provide a shock absorbing capability; and a central through hole (120) defined in the cover (12) to allow the central rod (13) to extend out from the cover (12).

3. The shock-absorbing device as claimed in claim 2, wherein the chamber (10) has a threaded hole (100) defined in the bottom and a threaded end (130) is formed at the first end of the central rod (13).

4. The shock-absorbing device as claimed in claim 3, wherein the forked end (132) further has at least one enlarged cutout (133) communicating with the slit (131) to provide a space to accommodate the multiple resilient rings (11).

5. The shock-absorbing device as claimed in claim 2, wherein the forked end (132) further has at least one enlarged cutout (133) communicating with the slit (131) to provide a space to accommodate the multiple resilient rings (11).

6. The shock-absorbing device as claimed in claim 1, wherein the chamber (10) has a threaded hole (100) defined in the bottom and a threaded end (130) is formed at the first end of the central rod (13).

7. The shock-absorbing device as claimed in claim 1, wherein the forked end (132) further has at least one enlarged cutout (133) communicating with the slit (131) to provide a space to accommodate the multiple resilient rings (11).

* * * * *